(12) United States Patent
Mahajan et al.

(10) Patent No.: US 9,631,954 B2
(45) Date of Patent: *Apr. 25, 2017

(54) MOVING PLATFORM ROLL SENSOR SYSTEM

(71) Applicant: TELEDYNE SCIENTIFIC & IMAGING, LLC, Thousand Oaks, CA (US)

(72) Inventors: Milind Mahajan, Thousand Oaks, CA (US); Bruce K. Winker, Ventura, CA (US); Donald Taber, Newbury Park, CA (US); Brian Gregory, Newbury Park, CA (US); Dong-Feng Gu, Thousand Oaks, CA (US)

(73) Assignee: TELEDYNE SCIENTIFIC & IMAGING, LLC, Thousand Oaks, CA (US)

( * ) Notice: Subject to any disclaimer, the term of this patent is extended or adjusted under 35 U.S.C. 154(b) by 579 days.

This patent is subject to a terminal disclaimer.

(21) Appl. No.: 14/172,745

(22) Filed: Feb. 4, 2014

(65) Prior Publication Data

US 2016/0223365 A1    Aug. 4, 2016

(51) Int. Cl.
*G01D 5/34* (2006.01)
*G01D 5/347* (2006.01)

(52) U.S. Cl.
CPC ........... *G01D 5/345* (2013.01); *G01D 5/3473* (2013.01)

(58) Field of Classification Search
CPC ...... G01D 5/345; G01D 5/3473; G01D 5/347; G01D 5/34; G01S 1/70; G01S 7/499; G01S 17/42; G01S 14/66; G01S 17/74; G01S 3/783; G01B 11/0023; F41G 7/30
See application file for complete search history.

(56) References Cited

U.S. PATENT DOCUMENTS

| | | | | |
|---|---|---|---|---|
| 3,522,433 A | * | 8/1970 | Houghten | H04B 7/185 398/122 |
| 3,594,085 A | * | 7/1971 | Wilmanns | G01N 21/211 250/225 |
| 3,932,039 A | * | 1/1976 | Frey | G01B 11/26 250/225 |

(Continued)

*Primary Examiner* — John Lee
(74) *Attorney, Agent, or Firm* — Koppel, Patrick, Heybl & Philpott

(57) ABSTRACT

A moving platform roll sensor system comprises an ellipsometric detector capable of detecting a polarized beam within the detector's line-of-sight, and measuring the beam's polarization state, such that the polarization state indicates the rotational orientation of the moving platform with respect to a predefined coordinate system. The ellipsometric detector comprises a venetian blind component through which the polarized beam passes, arranged such that the intensity of the exiting beam varies with its incident angle with respect to the moving platform, a polarizing beamsplitter which splits the exiting beam into components having orthogonal circular polarizations, the relative intensities of which vary with the relative polarization vector of the beam, and first and second detectors which receive the first and second orthogonal circular components and generate respective outputs that vary with the intensities of their received components. The beamsplitter preferably comprises a quarter wave plate and a polarization grating.

28 Claims, 3 Drawing Sheets

(56) References Cited

U.S. PATENT DOCUMENTS

| | | | |
|---|---|---|---|
| 4,097,007 A * | 6/1978 | Fagan | F41G 7/34 244/3.11 |
| 4,256,368 A | 3/1981 | Task | 350/408 |
| 4,318,591 A | 3/1982 | Elterman | 350/374 |
| 4,520,362 A * | 5/1985 | Charlot | G01S 7/025 342/361 |
| 5,007,692 A | 4/1991 | Matsuura | 350/6.8 |
| 5,042,951 A * | 8/1991 | Gold | G03F 7/70633 356/364 |
| 5,200,606 A | 4/1993 | Krasutsky et al. | 250/216 |
| 5,218,582 A | 6/1993 | Marchant | 369/14 |
| 5,259,567 A * | 11/1993 | Jano | G01D 5/345 244/3.11 |
| 5,272,351 A * | 12/1993 | Andressen | G01S 7/499 250/225 |
| 5,344,099 A * | 9/1994 | Pittman | F41G 7/28 244/3.13 |
| 5,373,359 A * | 12/1994 | Woollam | G01J 3/36 356/328 |
| 5,574,479 A * | 11/1996 | Odell | G06F 3/0346 345/158 |
| 5,596,403 A * | 1/1997 | Schiff | G01B 11/26 356/139.03 |
| 5,757,671 A * | 5/1998 | Drevillon | G01N 21/211 250/225 |
| 6,049,377 A * | 4/2000 | Lau | G01B 11/26 356/493 |
| 7,027,162 B2 * | 4/2006 | Lau | G01B 9/02068 356/498 |
| 7,227,638 B2 * | 6/2007 | Russell | G01J 4/00 356/366 |
| 7,230,689 B2 * | 6/2007 | Lau | G01B 11/002 356/73 |
| 8,009,292 B2 * | 8/2011 | Choi | G01B 11/0641 356/369 |
| 8,169,612 B2 * | 5/2012 | Gao | G01N 21/211 356/302 |
| 8,345,240 B2 * | 1/2013 | Kemp | G01B 11/272 356/367 |
| 8,368,887 B2 * | 2/2013 | Angood | G01B 11/272 356/364 |
| 8,564,777 B1 * | 10/2013 | Herzinger | G01N 21/211 356/369 |
| 9,341,697 B2 * | 5/2016 | Mahajan | G01S 17/42 |
| 2003/0043362 A1 * | 3/2003 | Lau | G01C 15/00 356/4.09 |
| 2004/0200947 A1 * | 10/2004 | Lau | G01B 11/002 250/202 |
| 2006/0192961 A1 | 8/2006 | Smith et al. | 356/364 |
| 2007/0229802 A1 * | 10/2007 | Lau | G01B 11/002 356/73 |
| 2008/0030855 A1 * | 2/2008 | Lau | G01B 11/002 359/529 |
| 2008/0316463 A1 | 12/2008 | Okada et al. | 356/4.01 |
| 2010/0052981 A1 | 3/2010 | Alexander et al. | 342/357.06 |
| 2010/0053615 A1 * | 3/2010 | Angood | G01D 5/345 356/364 |
| 2010/0097606 A1 * | 4/2010 | Kemp | G01D 5/345 356/367 |
| 2010/0110363 A1 * | 5/2010 | Escuti | G02B 5/1833 349/194 |
| 2010/0225876 A1 * | 9/2010 | Escuti | G02B 5/3016 349/187 |
| 2010/0328644 A1 | 12/2010 | Lu et al. | 356/5.01 |
| 2013/0342841 A1 * | 12/2013 | Mahajan | G01S 17/42 356/369 |
| 2015/0168290 A1 * | 6/2015 | Shachaf | G02B 7/28 356/369 |
| 2016/0134378 A1 * | 5/2016 | Young | G01S 11/00 342/361 |
| 2016/0195365 A1 * | 7/2016 | Winker | F41G 7/001 244/3.16 |
| 2016/0223365 A1 * | 8/2016 | Mahajan | G01D 5/3473 250/231.1 |

* cited by examiner

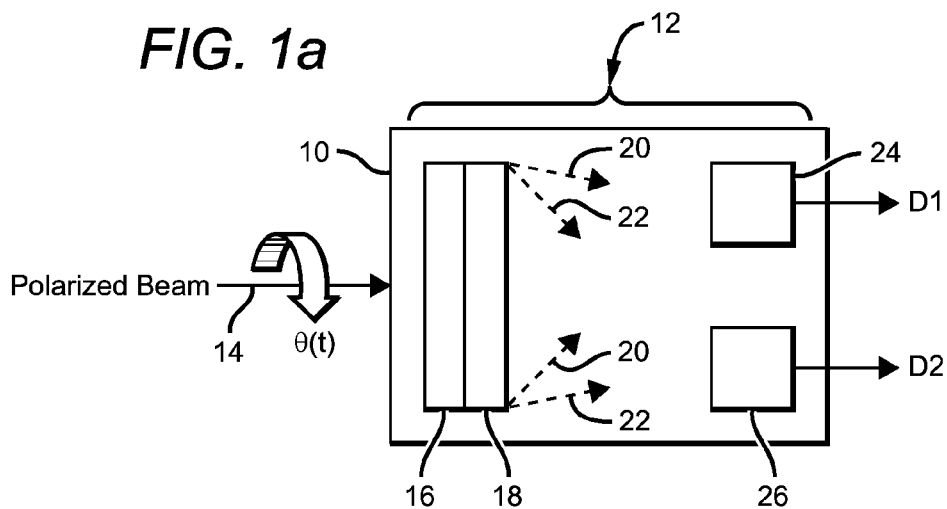
FIG. 1a
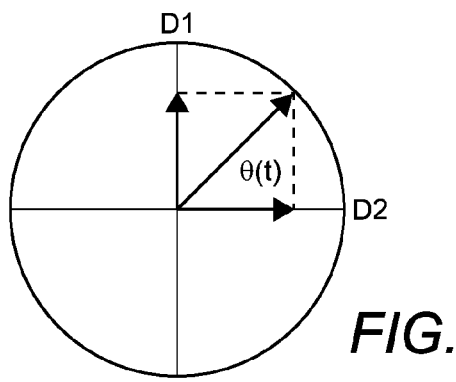
FIG. 1c
FIG. 1b
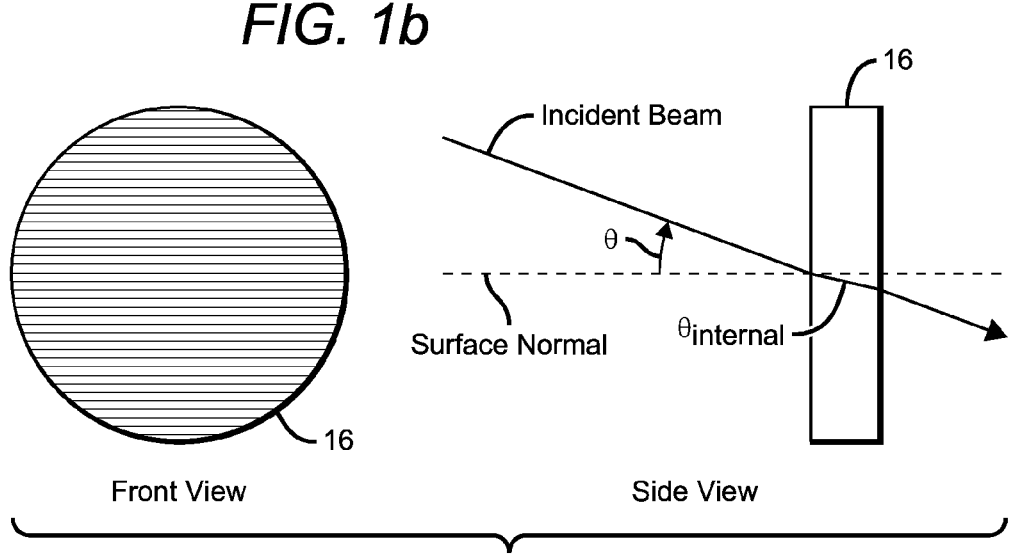

MOVING PLATFORM ROLL SENSOR SYSTEM

GOVERNMENT RIGHTS

This invention was made with Government support under DARPA contract HR0011-09-C-0016. The Government has certain rights in this invention.

BACKGROUND OF THE INVENTION

Field of the Invention

This invention relates generally to sensors for determining the rotational orientation of a platform moving in space.

Description of the Related Art

It is often necessary to know the rotational orientation of a moving body or platform. For example, it may be necessary to know the orientation of a moving projectile such as a missile in order to provide the missile with appropriate guidance data.

Several techniques are used to provide rotational orientation data of this sort. For example, it may be possible to determine the orientation of a moving platform by means of a radar system. However, such systems tend to be large and costly; they also consume a large amount of power and are easy to detect. Another approach is to affix accelerometers, gyroscopes, magnetometers etc. to the platform; however, these devices also tend to be expensive, bulky and complex.

It may also be possible to determine the rotational orientation of a moving platform by imaging it as it moves. However, this is likely to be difficult if conditions are turbulent or otherwise less than ideal, and may be impossible if the projectile is small and rapidly spinning.

SUMMARY OF THE INVENTION

A moving platform roll sensor system is presented which addresses several of the problems noted above, providing a robust, compact, low cost sensor for determining the rotational orientation of a moving platform.

The present sensor system is for use on a moving platform. The system comprises an ellipsometric detector, capable of 1) detecting a polarized beam of electromagnetic radiation when the ellipsometric detector is within the line-of-sight of the polarized beam, and 2) measuring the beam's polarization state, such that the polarization state indicates the rotational orientation of the moving platform with respect to a predefined coordinate system.

The ellipsometric detector comprises:
 a venetian blind component through which the detected polarized beam passes, arranged such that the intensity of the beam after it passes through the component varies with the incident angle of the detected beam with respect to the moving platform;
 a polarizing beamsplitter which receives the detected beam after it passes through the venetian blind component and splits the beam into first and second components having orthogonal circular polarizations, the relative intensities of which vary with the relative polarization vector of the detected beam; and
 first and second detectors arranged to receive the first and second components having orthogonal circular polarizations, respectively, and to generate respective outputs that vary with the intensities of their received components.

The beam is a preferably a linearly polarized laser beam, and the polarizing beamsplitter preferably comprises a quarter wave plate and a polarization grating. The ellipsometric detector also preferably comprises a protective window through which the detected polarized beam passes prior to reaching the venetian blind component.

These and other features, aspects, and advantages of the present invention will become better understood with reference to the following drawings, description, and claims.

BRIEF DESCRIPTION OF THE DRAWINGS

FIG. 1a is a block diagram of moving platform roll sensor system in accordance with the present invention.

FIG. 1b is a diagram illustrating front and side views of a venetian blind component as might be used with a moving platform roll sensor system in accordance with the present invention.

FIG. 1c is a diagram illustrating the components making up the rotational orientation value $\theta$.

DETAILED DESCRIPTION OF THE INVENTION

Figure 2:
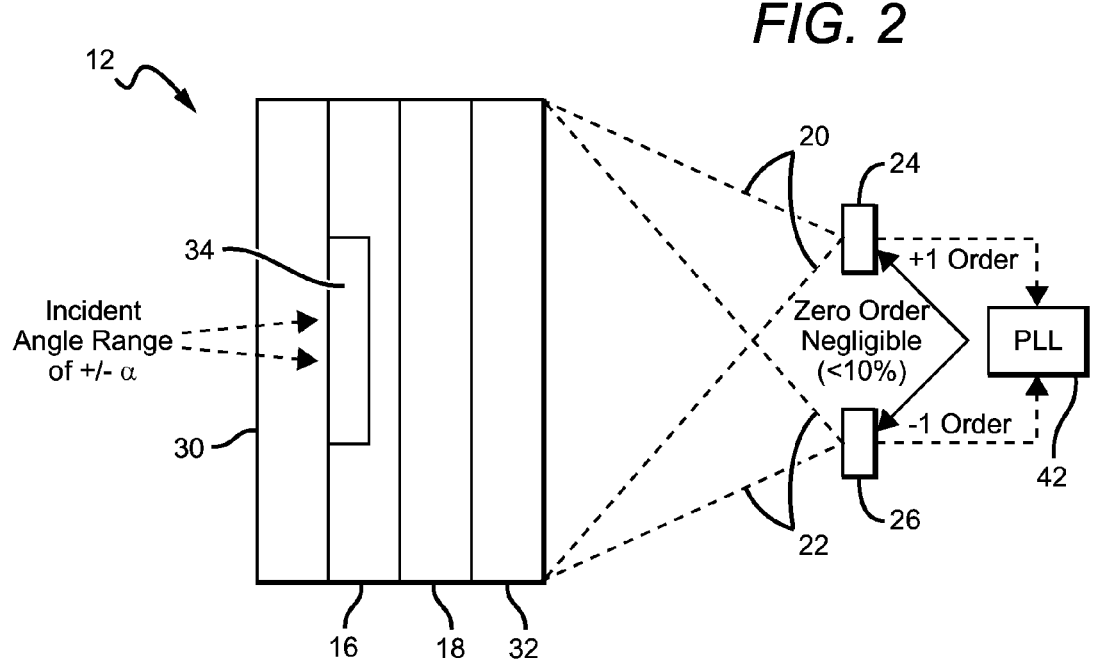
FIG. 2 is a block diagram of an ellipsometric detector as might be used with a moving platform roll sensor system in accordance with the present invention.

The basic principles of a moving platform roll sensor system per the present invention are illustrated in FIG. 1a. A moving platform 10, the rotational orientation $\theta$ of which is desired, comprises an ellipsometric detector 12 capable of detecting a polarized beam of electromagnetic radiation 14 when the ellipsometric detector is within the line-of-sight of the polarized beam. Optical beam 14 has a known polarization with respect to a predefined coordinate system. Ellipsometric detector 12 is arranged to measure the polarization state of the detected beam, which is used to indicate the azimuthal orientation $\theta$ of the moving platform—suitably a projectile—with respect to the predefined coordinate system.

Optical beam 14 is preferably a linearly polarized laser beam. One component of ellipsometric detector 12 is preferably a venetian blind component 16 through which the detected polarized beam passes. This venetian blind is a component arranged such that the intensity of the beam after it passes through the component varies with the incident angle of the detected beam with respect to the moving platform. An example is illustrated in the front and side views shown FIG. 1b, with $\theta$ being the tangential component of the angle between the incident beam and the vector normal to the venetian blind surface. As the platform rotates, the incident angle changes and transmission through the Venetian blind varies with this tangential component, which is in the plane orthogonal to the grating stripes. If the venetian blind material's refractive index is different from that of the material surrounding it, the refraction will cause the beam to bend slightly inside the substrate; $\theta_{internal}$ is the angle subtended by the refracted beam to surface normal inside the venetian blind substrate.

Ellipsometric detector 12 also includes a polarizing beamsplitter 18 which receives the detected beam after it passes through venetian blind component 16, and splits the beam into first and second components (20, 22) having orthogonal circular polarizations, the relative intensities of which vary with the relative polarization vector of the detected beam. Then, first and second detectors (24, 26) are arranged to receive first and second components 20 and 22, respectively, and to generate respective outputs D1 and D2 that vary with the intensities of their received components, with D1+D2 being proportional to the total intensity of the detected beam.

When so arranged, the output D1 of detector 24 is proportional to $\cos^2\theta$ and the output D2 of photodetector 30 is proportional to $\sin^2\theta$, where $\theta$ is the azimuthal orientation of moving platform 10 with respect to the predefined coordinate system. Thus, azimuthal orientation $\theta$ is given by:

$$\theta = \cos^{-1}\sqrt{\frac{D1}{D1+D2}}.$$

A simplification or an approximation of this expression might also be used. The components making up $\theta$ are illustrated in FIG. 1c.

A preferred embodiment of ellipsometric detector 12 is shown in FIG. 2. Polarizing beamsplitter 18, located adjacent to venetian blind component 16, is preferably a conformal design which comprises a quarter wave plate, which separates the polarized beam into two orthogonal circular polarizations, and a polarization grating, with the polarization grating preferably comprising a holographically-treated liquid crystalline material. This polarization grating arrangement serves to create angular separation between orthogonal circular polarizations. One suitable grating is described in J. Kim, et al, "Wide-angle, non-mechanical beam steering using this liquid crystal polarization gratings," Proc. of SPIE Vol. 7093 709302-1, which describes the fabrication of a film (~1-5 μm thick) on a fused silica substrate. The film serves as a high efficiency polarization grating with only two diffraction orders (±1) corresponding to two orthogonal circular polarizations. The polarization grating of polarizing beamsplitter 18 is preferably arranged such that >90% of the light exiting the beamsplitter goes to +1 order or −1 order, with <10% of the light being zero order.

Ellipsometric detector 12 preferably also includes a protective window 30 through which detected polarized beam 14 passes prior to reaching venetian blind component 16. Window 30 is preferably made from a hard material, which is preferably coated or composed to filter out wavelengths outside the spectral range of the polarized beam's electromagnetic radiation.

Ellipsometric detector 12 preferably also includes a lens 32 through which the detected polarized beam passes after passing through polarizing beamsplitter 18, and which focuses first and second orthogonal components 20 and 22 onto first and second detectors 24 and 26, respectively. Lens 32 preferably has an f-number of F/3.0 or less. Note that a lens could be positioned in front of beamsplitter 18 rather than behind it, though this is not preferred. Ellipsometric detector 12 may also include a retroreflector 34, such as a corner cube, arranged to reflect the polarized beam 14.

Figure 3A:
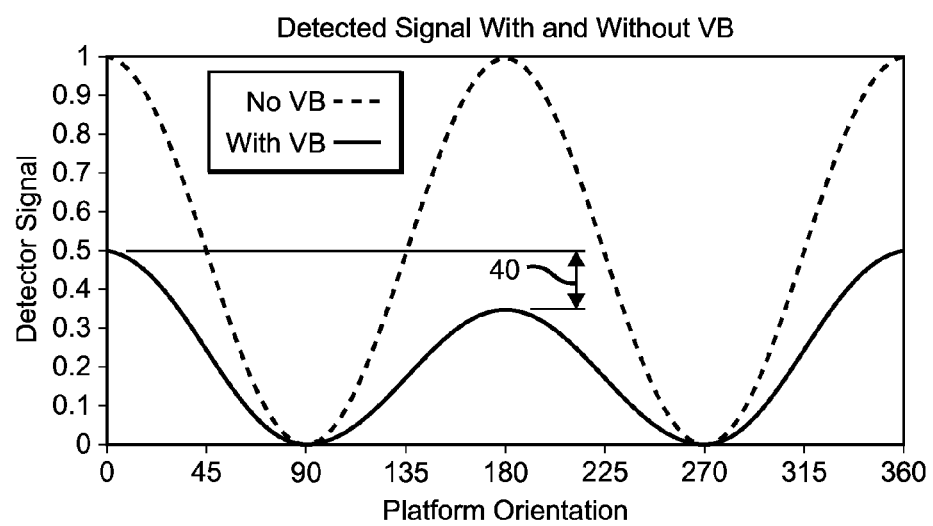
FIG. 3a depicts plots of detector signal vs. platform orientation for a moving platform roll sensor system in accordance with the present invention, with and without the use of a venetian blind component.

As noted above, venetian blind component 16 is arranged such that the intensity of the beam after it passes through the component varies with the tangential component of the incident angle of the detected beam with respect to the moving platform. This angle-dependent transmission characteristic of the venetian blind component resolves orientational ambiguity (up vs. down, 0° vs. 180°) in the ellipsometer. This is illustrated in FIG. 3a, which shows plots of detector signal vs. platform orientation for a moving platform roll sensor system in accordance with the present invention, with and without the use of a venetian blind component. With no venetian blind component, the detector signal's peak intensity is essentially constant over time, making a determination of up vs. down or 0° vs. 180° orientation difficult or impossible. However, with venetian blind component 16 in place, the detector signal's peak intensity varies over time, with the difference 40 between intensity peaks being indicative of orientation. Once orientation is determined, a circuit such as a phase-locked-loop (PLL) (42, shown in FIG. 2) can be coupled to ellipsometric detector 12 and arranged to track the rotational orientation and thereby mitigate the degradation in the accuracy of the rotational orientation determination that might otherwise occur if the optical link between the polarized beam and the ellipsometric detector is disrupted.

The sensitivity of the ellipsometric detector to platform rotation is at minimum when the rotational orientation is such that light is primarily directed to one detector. If the orientation of the moving platform is not varying, and the detected beam is primarily directed onto just one of detectors 24 and 26, its orientation may be difficult to track, or the PLL's phase lock may be lost. This can be addressed by including a means of dithering polarized beam 14, such that the linear polarization of the polarized beam is occasionally or periodically rotated. This can make tracking the orientation of the moving platform easier by, for example, enabling phase lock on the slowly rotating platform.

Figure 3B:
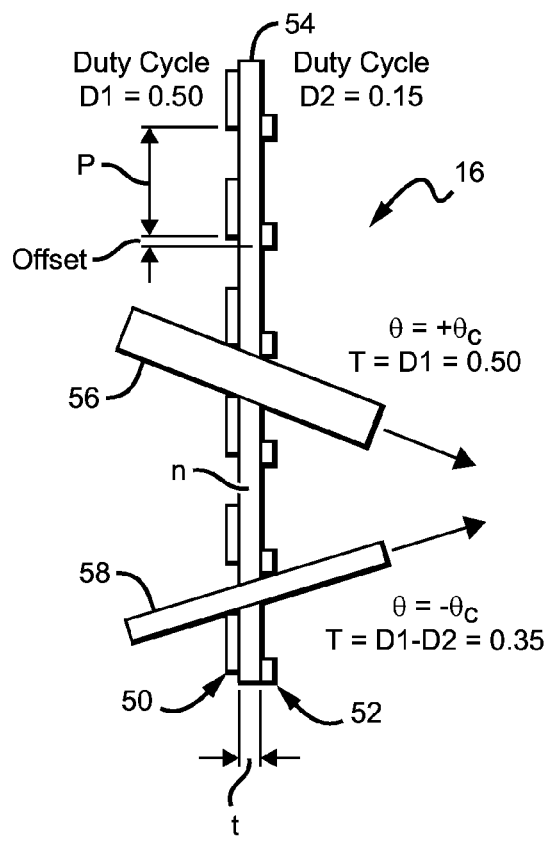
FIG. 3b is a block diagram of a venetian blind component as might be used with a moving platform roll sensor system in accordance with the present invention.

Venetian blind component 16 preferably comprises two spatially separated intensity gratings affixed to a common substrate; an exemplary structure is shown in FIG. 3b. Here, a front intensity grating 50 having a duty cycle DC1 (=0.5 in this example) and a back intensity grating 52 having a duty cycle DC2 (preferably from 0.1 to 0.4; 0.15 in this example) are mounted on opposite sides of a substrate 54. Though the front and back intensity gratings have different duty cycles, they should share a common period P—though the second grating may be offset with respect to the first (as shown).

The substrate 54 is characterized by a thickness t and a refractive index n; t and n can be chosen to match commonly available substrates. Transmission through the venetian blind component distinguishes between incident angles of opposite sign as shown. Thus, for beam 56, $\theta=+\theta_c$, and transmission T through the component is equal to DC1=0.50; however, for beam 58, $\theta=-\theta_c$, and T=DC1−DC2=0.35, where $\theta$ is the angle between the incident beam and the vector normal to the venetian blind surfaces (incidence angle), and $+/-\theta_c$ are the angles at which the venetian blind reaches the first maximum and first minimum transmission values, respectively.

Assuming that the offset between the front and back intensity gratings is zero, transmission through the component is minimal when $P/2=t\tan(\theta_{internal})$. As noted above, if the venetian blind material's refractive index is different from that of the material surrounding it, the refraction will cause the beam to bend slightly inside the substrate. $\theta_{internal}$ is the angle subtended by the refracted beam to surface normal inside the venetian blind substrate. The angular dependence of transmission can be biased by introducing an offset between the two gratings. Overall grating performance is specified by selecting period P, the offset, and duty cycles DC1, DC2 as needed. The goal is to obtain adequate contrast between up and down orientation over the range of incident angles likely to be encountered. The venetian blind's transmission dependence on incident angle is mathematically equivalent to the convolution of the two square wave representing the transmission of the two individual gratings that comprise it.

Figure 3C:
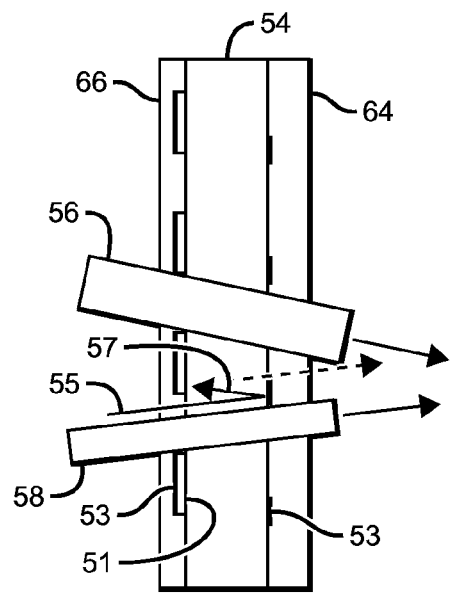
FIG. 3c is a schematic drawing for one of the possible arrangement of the films/coatings on a venetian blind that enable its polarization sensing/discrimination functions.

The venetian blind component 16 and polarizing beamsplitter 18 can be fabricated as a monolithic structure. Such a structure can be formed on a single substrate having an input side and an exit side. One possible embodiment example is given in FIG. 3c, in which two intensity gratings are fabricated on opposite sides of the substrate to form the venetian blind component. To enhance the polarization discrimination function, it is preferred that at least one of the intensity gratings (on the left side of substrate 54 in FIG. 3c) has an absorptive element 51 with a sub-micron thickness (typically about 0.3-0.8 microns), and a reflective element 53 which preferably has a thickness of about 50-100 nm. The function of absorptive element 51 is to attenuate the beam component 55 reflected by the reflective element 53 making up the intensity grating on the right side of substrate 54. Otherwise, an intra-substrate reflection 57 can leak through and lessen the intensity difference between beams 56 and 58. The function of the reflective element is to ensure 100% blockage with a relatively thin metal layer. A quarter wave plate (66 in FIG. 3c) and a polarization grating (64 in FIG. 3c) can be placed on either side of the venetian blind, as long as the quarter wave plate meets the incoming beam first. However, depending on monolithic fabrication methods, a preference exists for their placement. If a quarter wave plate and a polarization grating are made by directly coating liquid crystal films onto a venetian blind substrate, it is preferred that the quarter wave plate is placed on the beam input side (the side with absorptive element 51), and the polarization grating is placed on the exit side of the venetian blind. When so arranged, the surface on which the polarization grating is coated will be smoother, resulting in much less liquid crystal alignment defects during the polarization grating coating process: the UV hologram used to create the polarization grating coating is less perturbed, with lower surface steps and lower elastic train in the liquid crystal. In contrast to a periodic liquid crystal orientation change in a polarization grating, the liquid crystal alignment in a quarter wave plate is uniform, and it has a much higher tolerance to surface steps. Therefore, the intensity grating having absorptive element 51 is preferably placed on the input side of the venetian blind, as shown in FIG. 3c. If a quarter wave plate and a polarization grating are made separately and then fabricated or placed onto a venetian blind, their placement can be on either side of the venetian blind.

Figure 4:
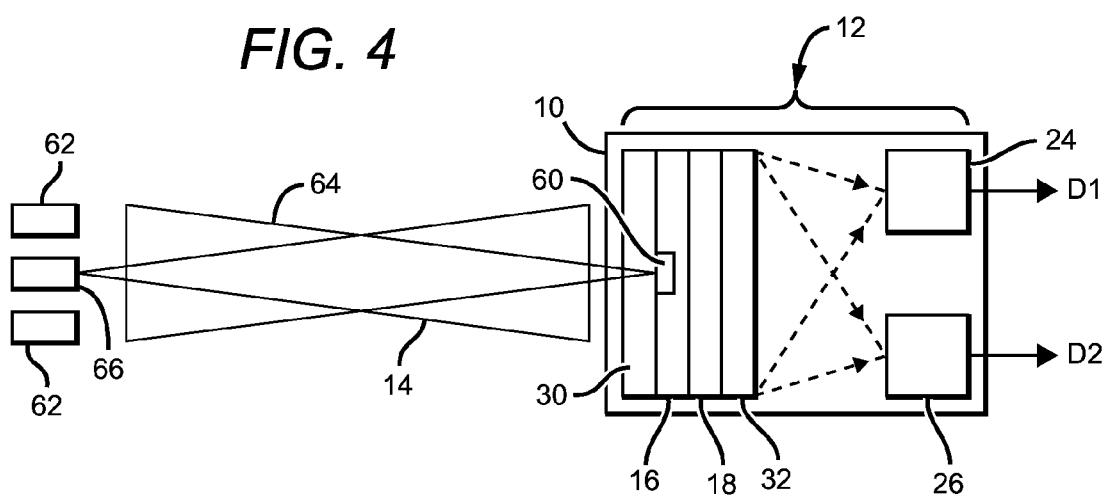
FIG. 4 is a block diagram of a moving platform guidance system which includes a moving platform roll sensor system in accordance with the present invention.

A complete moving platform guidance system may be formed around the present moving platform roll sensor system, as shown in FIG. 4. Here, the ellipsometric detector 12 on moving platform 10 may include a retroreflector 60, such as a corner cube, arranged to reflect the polarized beam 14. A complete system would preferably further comprise a detector, an array of detectors, and/or a camera 62 arranged to receive the reflected beam 64. The polarized beam is generated by a transmitter 66, and a free space link is established between transmitter 66 and ellipsometric detector 12 when the ellipsometric detector is within the line-of-sight of polarized beam 14.

Transmitter 66 may be further arranged to encode guidance commands into polarized beam 14 by, for example, pulsing the beam. Components on the moving platform such as ellipsometric detector 12 may then be arranged to detect and decode the pulses and thereby detect the guidance commands. The moving platform may be arranged to vary its spatial orientation in response to the guidance commands.

Ellipsometric detector 12 is preferably arranged such that it is weight- and rotation-balanced around the center axis of moving platform 10. This may be facilitated by using a polarizing beamsplitter which includes a polarization grating as discussed above, which allows detectors 24 and 26 to be positioned side-by-side and rotation balanced.

The detectors 24 and 26 for the present moving platform roll sensor system are preferably sized to detect incoming polarized beams having an angle of incidence of +/−α degrees, where a is from 2-30 degrees.

The embodiments of the invention described herein are exemplary and numerous modifications, variations and rearrangements can be readily envisioned to achieve substantially equivalent results, all of which are intended to be embraced within the spirit and scope of the invention as defined in the appended claims.

We claim:

1. A moving platform roll sensor system, comprising:
   a moving platform, said platform comprising an ellipsometric detector capable of detecting a polarized beam of electromagnetic radiation when said ellipsometric detector is within the line-of-sight of said polarized beam, and of measuring said polarized beam's polarization state such that said polarization state indicates the rotational orientation of said moving platform with respect to a predefined coordinate system;
   said ellipsometric detector comprising:
      a polarizing beamsplitter which receives said detected beam and splits said beam into first and second components having orthogonal circular polarizations, the relative intensities of which vary with the relative polarization vector of said detected beam;
      first and second detectors arranged to receive said first and second components having orthogonal circular polarizations, respectively, and to generate respective outputs D1 and D2 that vary with the intensities of their received components; and
      circuitry arranged to receive D1 and D2 and to calculate the rotational orientation θ of said moving platform with respect to said predefined coordinate system, with θ given by:

$$\theta = \cos^{-1}\sqrt{\frac{D1}{D1+D2}}.$$

2. The system of claim 1, wherein said beam is a linearly polarized laser beam.

3. The system of claim 1, wherein said polarizing beamsplitter comprises a quarter wave plate and a polarization grating.

4. The system of claim 3, wherein said polarization grating comprises a holographically-treated liquid crystalline material.

5. The system of claim 1, further comprising a venetian blind component through which said detected polarized beam passes, said component arranged such that the intensity of the beam after it passes through the component varies with the incident angle of said detected beam with respect to said moving platform.

6. The system of claim 5, wherein said ellipsometric detector further comprises a protective window through which said detected polarized beam passes prior to reaching said venetian blind component.

7. The system of claim 6, further comprising a coating applied to said protective window to filter out wavelengths outside the spectral range of said polarized beam's electromagnetic radiation.

8. The system of claim 5, wherein the polar angle-dependent transmission characteristic of said venetian blind component is arranged such that orientational ambiguity in the ellipsometer is resolved.

9. The system of claim 5, wherein said venetian blind component comprises first and second intensity gratings spatially separated from each other.

10. The system of claim 9, wherein said first and second intensity gratings are located on opposite sides of a substrate.

11. The system of claim 9, wherein said first and second intensity gratings have respective duty cycles and share a common period.

12. The system of claim 11, wherein said second intensity grating is offset with respect to said first intensity grating.

13. The system of claim 9, wherein said at least one of first and second intensity gratings comprises a reflective element to block light and an absorptive element to attenuate internally reflected light.

14. The system of claim 5, wherein said venetian blind component and said polarizing beamsplitter are formed as a monolithic structure, said structure comprising:
   a single substrate having an input side and an exit side;
   first and second intensity gratings fabricated on said input and exit sides, respectively, to form said venetian blind component;
   a quarter wave plate fabricated or placed on said input side or said exit side of said substrate;
   a polarization grating fabricated or placed on said input side or said exit side of said substrate, said quarter wave plate and said polarization grating arranged such that an incoming beam impinges on said quarter wave plate before impinging on said polarization grating.

15. The system of claim 14, wherein said quarter wave plate is fabricated or placed on said input side of said substrate and said polarization grating is fabricated or placed on said exit side of said substrate.

16. The system of claim 1, wherein said ellipsometric detector further comprises a lens through which said detected polarized beam passes and which focuses said first and second components onto said first and second detectors.

17. The system of claim 16, wherein said lens has an f-number of F/3.0 or less.

18. The system of claim 3, wherein the polarization grating of said polarizing beamsplitter is arranged such that >90% of the light exiting said beamsplitter goes to +1 order or −1 order, with <10% of said light being zero order.

19. The system of claim 1, wherein said moving platform further comprises a retroreflector arranged to reflect said polarized beam, said system further comprising a detector, an array of detectors, or a camera arranged to receive said reflected beam.

20. The system of claim 1, wherein the output D1 of said first detector is proportional to $\cos^2 \theta$ and the output D2 of said second detector is proportional to $\sin^2 \theta$.

21. The system of claim 1, wherein said first and second detectors are sized to detect incoming polarized beams having an angle of incidence of +/−α degrees, where α is from 2-30 degrees.

22. The system of claim 1, wherein said moving platform has an associated center axis and said ellipsometric detector is arranged such that it is weight- and rotation-balanced around said center axis.

23. The system of claim 1, further comprising a means of dithering the polarization state of said polarized beam such that the polarization of said polarized beam is occasionally or periodically rotated.

24. The system of claim 1, wherein said polarized beam is generated by an transmitter and a free space link is established between said transmitter and said ellipsometric detector when said ellipsometric detector is within the line-of-sight of said polarized beam.

25. The system of claim 24, further comprising a phase-locked-loop (PLL) circuit coupled to said ellipsometric detector and arranged to track said rotational orientation and thereby mitigate the degradation in the accuracy of said rotational orientation determination that might otherwise occur when said link is disrupted.

26. The system of claim 1, wherein said polarized beam is generated by a transmitter, said transmitter further arranged to encode guidance commands into said beam by pulsing said beam, said moving platform arranged to detect and decode said pulses and thereby detect said guidance commands.

27. The system of claim 26, wherein said moving platform is arranged to vary its spatial orientation in response to said guidance commands.

28. A moving platform guidance system, comprising:
   a transmitter which generates a pulsed beam having a known polarization with respect to a predefined coordinate system;
   a moving platform, said platform comprising an ellipsometric detector capable of detecting a polarized beam when said ellipsometric detector is within the line-of-sight of said polarized beam, and of measuring said polarized beam's polarization state such that said polarization state indicates the rotational orientation of said moving platform with respect to a predefined coordinate system;
   said ellipsometric detector comprising:
      a venetian blind component through which said detected polarized beam passes, said component arranged such that the intensity of the beam after it passes through the component varies with the incident angle of said detected beam with respect to the said moving platform;
      a polarizing beamsplitter which receives said detected beam after it passes through said venetian blind component and splits said beam into first and second components having orthogonal circular polarizations, the relative intensities of which vary with the relative polarization vector of said detected beam, said polarizing beamsplitter including a polarization grating arranged to create angular separation between said orthogonal circular polarizations;
      first and second detectors arranged to receive said first and second components having orthogonal circular polarizations, respectively, and to generate respective outputs D1 and D2 that vary with the intensities of their received components;
      a retroreflector arranged to reflect said polarized beam; and
      circuitry arranged to receive D1 and D2 and to calculate the rotational orientation θ of said moving platform with respect to said predefined coordinate system, with θ given by:

$$\theta = \cos^{-1}\sqrt{\frac{D1}{D1+D2}};$$

and a detector, an array of detectors, or a camera arranged to receive said reflected beam.

* * * * *